2 Sheets—Sheet 1.

R. STANLEY.

TUNNELING MACHINE.

No. 11,333. Reissued May 9, 1893.

Witnesses:
J. B. McGirr.
Lotta H. Coleman

Inventor:
Reginald Stanley
by Dowbleday & Bliss
attys

2 Sheets—Sheet 2.

R. STANLEY.

TUNNELING MACHINE.

No. 11,333. Reissued May 9, 1893.

Witnesses:

J. B. McGirr.

Lotta H. Ockman.

Inventor

Reginald Stanley by Doubleday & Blair attys

UNITED STATES PATENT OFFICE.

REGINALD STANLEY, OF NUNEATON, ENGLAND.

TUNNELING-MACHINE.

SPECIFICATION forming part of Reissued Letters Patent No. 11,333, dated May 9, 1893.

Original No. 414,893, dated November 12, 1889. Application for reissue filed September 8, 1890. Serial No. 364,378. Patented in England February 14, 1887, No. 2,312, June 10, 1887, No. 8,375, and February 6, 1888, No. 1,763; in Austria-Hungary February 15, 1888, No. 41,106 and No. 5,202; in Germany November 14, 1888, No. 48,122; in Belgium November 17, 1888, No. 83,971; in France November 21, 1888, No. 171,976; in Queensland June 12, 1889, No. 945; in New South Wales June 12, 1889, No. 1,476, and in New Zealand June 21, 1889, No. 3,753.

*To all whom it may concern:*

Be it known that I, REGINALD STANLEY, of Nuneaton, in the county of Warwick, England, have invented certain new and useful Improvements in Tunneling-Machines, (for which I have received Letters Patent as follows: No. 2,312, dated February 14, 1887; No. 8,375, dated June 10, 1887, and No. 1,763, dated February 6, 1888, all of Great Britain; No. 41,106 and No. 5,202, dated February 15, 1888, of Austria-Hungary; No. 48,122, dated November 14, 1888, of Germany; No. 83,971, dated November 17, 1888, of Belgium; No. 171,976, dated November 21, 1888, of France; No. 945, dated June 12, 1889, of Queensland; No. 1,476, dated June 12, 1889, of New South Wales, and No. 3,753, dated June 21, 1889, of New Zealand;) and I do hereby declare the following is a full, clear, and exact description of the invention, that will enable others skilled in the art to which it appertains to make and use the same, reference being had to the accompanying drawings, and to the letters of reference marked thereon, which form part of this specification.

My invention relates to boring or tunneling machinery of the class described in the specification of Letters Patent granted to me and dated July 13, A. D. 1886, No. 345,551.

In order to enable my invention to be fully understood, I will describe how it can be carried into practice by reference to the accompanying drawings, in which—

Figure 1:
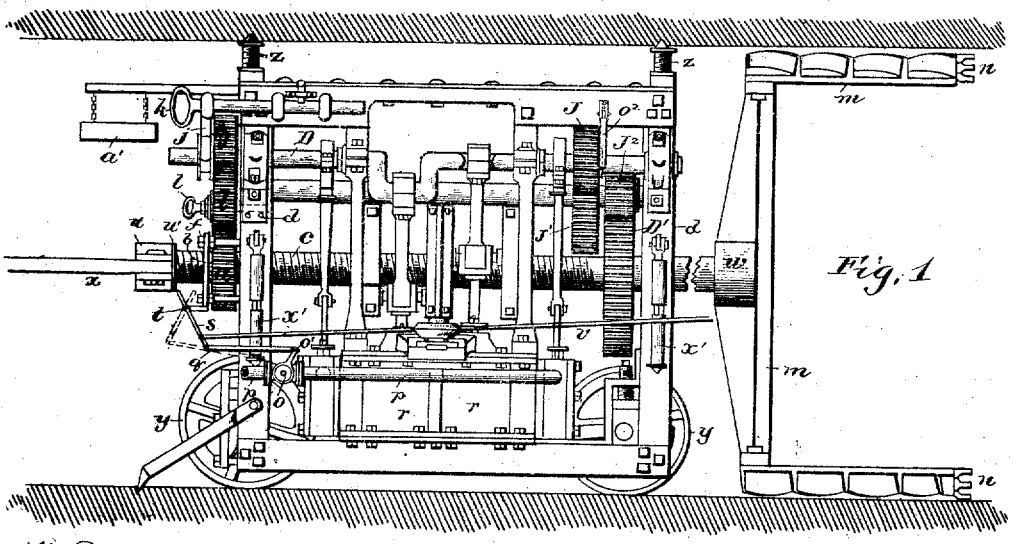
Figure 2:
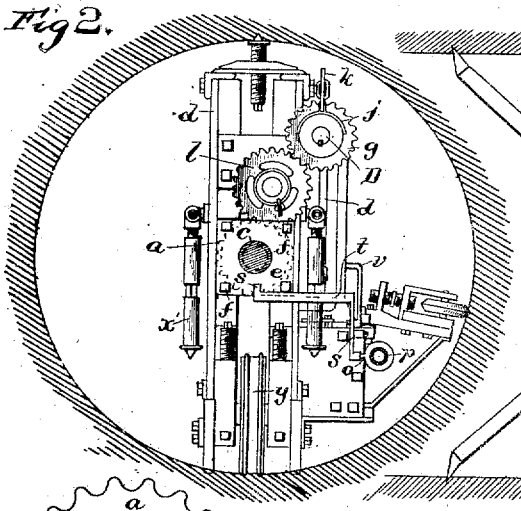
Figure 4:
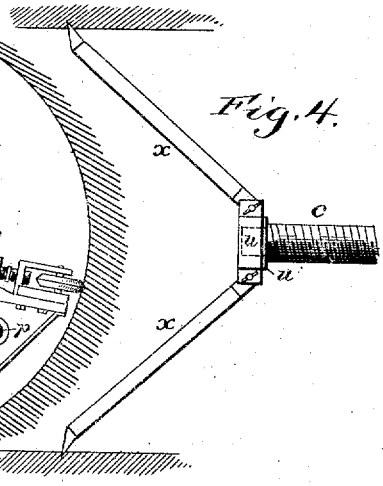
Figure 7:
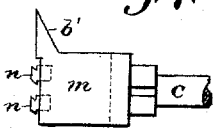
Figure 8:
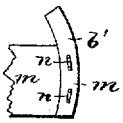
Figure 16:
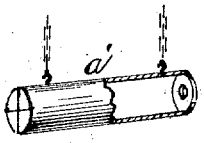
Figure 5:
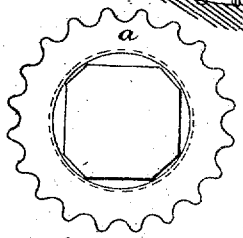
Figure 3:
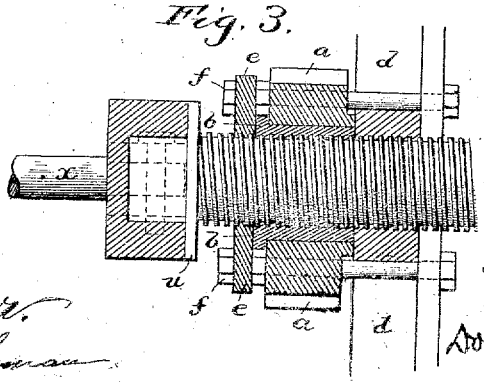
Figure 9:
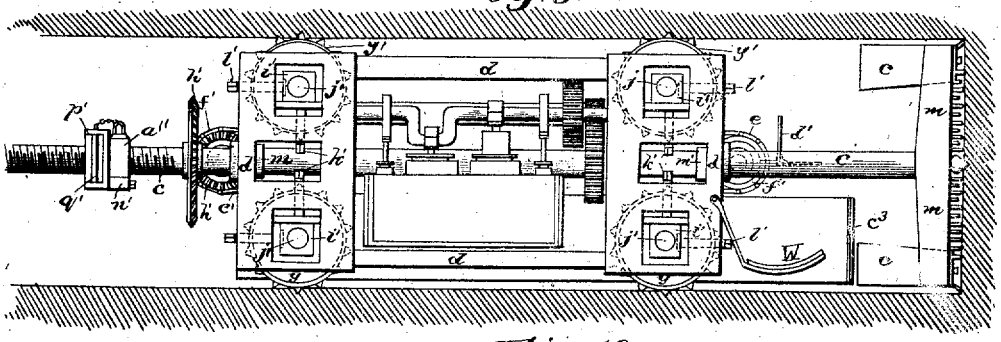
Figure 10:
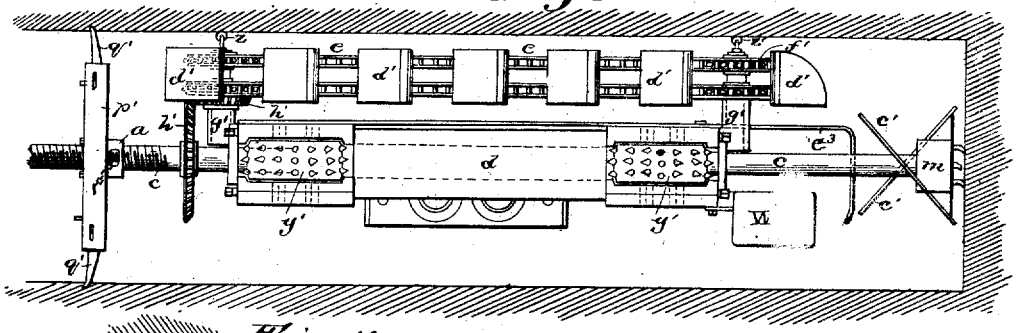
Figure 11:
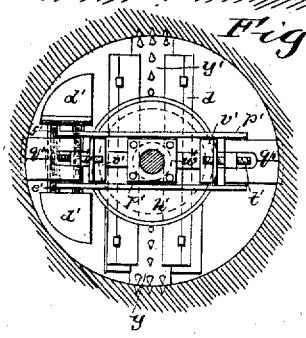
Figure 12:
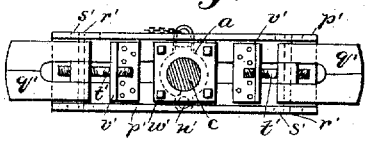
Figure 6:
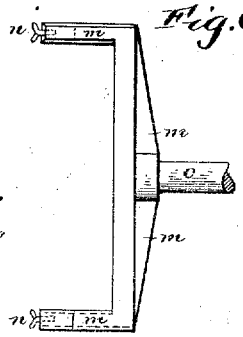
Figure 13:
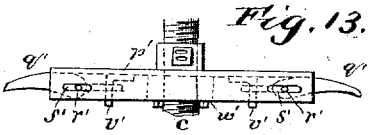
Figure 14:
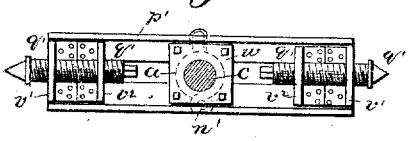
Figure 15:
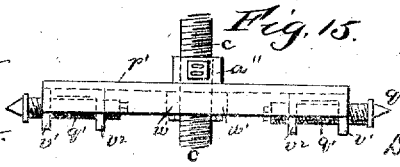

Figure 1 is a side elevation of a boring or tunneling machine which is fixed in the tunnel during the cutting operation and constructed according to my present improvements. Fig. 2 is a rear end elevation of the the same, partly in section. Figs. 3, 4, and 5 are enlarged views of parts of the machine. Fig. 6 is a side elevation of a modified form of horizontal cutting-arms. Fig. 7 is a plan of the said arms, and Fig. 8 is a front view of one of the ends of the same. Fig. 9 is a side elevation of a boring or tunneling machine, which is propelled during the cutting operation, showing the modifications necessary to adapt my improvements to such machine. Fig. 10 is a plan, and Fig. 11 is an end elevation, of the same. Fig. 12 is a rear elevation, and Fig. 13 is a side elevation, of the separate frame fitted with adjustable hinged cows. Figs. 14 and 15 are views similar to Figs. 12 and 13, but showing the said frame fitted with screw-threaded pins. Fig. 16 is a perspective, parts being broken away, of the dialing instrument.

Similar letters in all the figures indicate similar or corresponding parts.

I will first describe my improvements by reference to Figs 1 to 5.

*a*, Figs. 1 and 3, is the cog-wheel, (shown also detached in face view at Fig. 5,) fitted with the screw-threaded bush *b*, working upon or over the thread of the central or screw-threaded shaft *c*. This wheel, hereinafter for the sake of distinction called the "propelling-wheel," is held in position on the frame *d* of the machine by means of a plate *e* and bolts and nuts *f f*.

*g* is the cog-wheel on the crank-shaft D of the machine, to which wheel, through the intermediate wheel *l*, the propelling-wheel *a* is geared.

*j* is a shifting-fork operated by a handle *k* for throwing the cog-wheel *g* in and out of gear.

*i* is a pin inserted through a hole in the wheel *l* and in the frame *d* of the machine when required to prevent the propelling wheel *a* from revolving while the cutting-gear and the screw-threaded shaft *c*, with the arms *m* and cutters *n* attached thereto, are in motion; or any other suitable means can be employed for this purpose. The screw-threaded shaft *c*, with its arms and cutters, is driven from the crank-shaft D of the engine by means of a pinion J, mounted on the said shaft, a wheel J′ and a pinion $J^2$ on another shaft, and a spur-wheel D′ on the screw-threaded shaft *c*.

*o* is the cock whereby the compressed air or other motive fluid is admitted to or shut off from the cylinders *r r* of the engine, the said cock being situated on the supply-pipe *p*.

The arrangement I employ for shutting off the supply of the motive fluid at a given point of travel of the screw-threaded shaft *c* consists of a rod *q*, jointed to a crank or projection *o'* on the handle of the plug of the cock *o* and to a lever *s*, moving on a center *t*, fixed to the plate *e*, as shown in Fig. 1, or to any suitable part of the frame *d* of the machine. The free end of the lever is acted upon by a collar *u'* on the threaded shaft *c* when the rear end of the shaft has worked up to or near to the back of the frame *d*, and is moved into the position shown in dotted lines, thereby shutting the cock *o* and stopping the engine. A similar effect is produced when the frame *d*, which is being advanced, reaches or nearly reaches the back of the arms *m* by means of a rod *v*, jointed to the lever *s*, and having its free end in a position to be acted upon by the back of the arms *m* at the point *w*.

When it is required to work the engine, the collar *u'* or the arms *m* having moved the rod *s* so as to shut the cock *o*, the rod *q* is temporarily uncoupled from the projection *o'* until the frame or the arms have sufficiently advanced to allow of its being coupled up again without shutting the cock *o*.

*x x* are arms forming a horizontal cow or spray, (shown in Fig. 1 and in detached plan view at Fig. 4,) jointed to the cap *u* at the back of the collar *u'* on the rear end of the shaft *c* and intended to catch into the two sides of the heading, so as to effectually prevent the shaft *c* from being forced back while the frame *d* of the machine is being moved on its carrying-wheels *y y* into position ready to be fixed to perform a fresh cutting. The arms *x x*, in conjunction with the arms *m*, which are set at this time across the heading, serve to assist in steadying the frame and in keeping it upright while it is being advanced between the cuts. When the frame is fixed and the cutting is commenced, the cap *u* and arms *x x* are removed and placed on one side. It will be obvious, however, that other means could be employed for the same purpose as the arms *x x* are used—such, for example, as a prop of timber set in the floor and roof of the heading at the back of the shaft *c*.

The pinion J on the crank-shaft D of the engine works into the cutting-gearing, consisting of the wheels J', $J^2$, and D', and is prevented from sliding in and out of gear while the engine is in motion by means of a hinged bolt $o^2$.

The machine is worked as follows: When it is required to advance the frame and engine parts of the machine while the threaded shaft *c* remains stationary in the heading, the pinion J is put out of gear with the wheel J' and the cog-wheel *g* is put in gear with the intermediate wheel *l*, from which the fixing-pin *i* must be removed. The ends of the cow or spray *x x* are secured in the sides of the heading, the frame is unfixed from the sides and top of the heading by unscrewing the screw-pins *x' x'* and Z Z, respectively, and the engine is set in motion. The propelling-wheel *a* will be thereby caused to revolve on the threaded shaft *c* and will advance along the shaft, moving with it the frame and engine parts of the machine toward the back of the cutter-arms *m* as far as required, the shaft and cutter-arms being meanwhile prevented from moving backward in the heading by the cow or spray *x x*. The frame can then be again fixed in the heading ready for a fresh cutting operation. In order to cause the threaded shaft *c* and arms *m* to advance or retire without rotating, the frame *d* is fixed in the heading by means of the screw-pins *x' x'* and Z Z, the cow or spray *x x* must be removed, and the engine set in action. The engine will rotate the propelling-wheel *a*, and this will cause the shaft and arms to move forward or rearward, according to the direction in which the wheel *a* is revolved. When the threaded shaft *c* and the cutter-arms *m* are required to be simultaneously rotated and advanced in order to perform a cutting operation, the frame *d* must be fixed in the heading, as above described, and the wheel *g* disengaged (by operating the fork *j*) from the wheel *l*, which must be locked to the frame *d* by inserting the pin *i* therein, so as to fix the propelling-wheel *a*. The pinion J and wheel J' must be placed in gear and the engine set in action, when the shaft *c*, with the arms *m* and cutters *n*, will revolve and will, by working through the threaded bush *b* of the propelling-wheel *a*, be caused to advance. When it is required to regulate the speed of advance of the shaft *c* when the cutters meet with stones or other very hard material, or upon other occasions, the pin *i* is withdrawn, when the propelling-wheel *a* can be so regulated by means of a brake or otherwise as to give way to the pressure and prevent the shaft advancing in the frame as fast as it would otherwise do. The engine can be made so that it can be reversed and worked in either direction, or it can be constructed to work in one direction only. In the former case it will be obvious that, if required, the frame can be caused to move backward in the heading by simply reversing the engine and propping or supporting the radial arms *m* from the face of the heading, or securing each end of the said arms by means of wedges to the sides of the heading, so that when the wheel *a* is rotated the frame *d* will move along the threaded shaft *c* toward the back end thereof.

In the drawings I have shown the machine provided with horizontal arms and cutters adapted to cut an annular groove in the heading; but it will be understood that my invention is equally applicable for use with radial arms having cutters arranged on their face and adapted to cut away the whole face of the heading.

To allow the direction of cutting to be regulated, I find it advantageous to attach to the machine a small dialing-instrument *a'*, consisting of a tube with two wires stretched perpendicularly to each other over the ends thereof. See Figs. 1 and 16. This instrument is arranged parallel with the axis of the shaft *c*, and by sighting through it at a light held at some distance off in the rear of the working the direction of the cut can be accurately seen, and then, if required, be adjusted, or the following mode of working is adopted: After the frame and engine parts are advanced, and before fixing and making the next cut, I measure with a gage from the back of the screw-threaded shaft to the sides of the heading, so as to get it exactly in the center, in which case, when the frame is fixed, it will cut straight forward in the direction it is set or if it is desired to change the direction of the cut to the right or left the frame is fixed accordingly by measuring from the shaft to the side in like manner.

By the use of the propelling-wheel *a* the frame and engine parts of the machine can be moved forward and backward in a more sure and accurate manner than has hitherto been the case. A saving in wear and tear is effected, and the rate of advance of the cutters relatively to their speed of rotation can be regulated. The withdrawal and advance of the threaded shaft *c*, with the arms and cutters, for the purpose of changing the cutters or for other purposes while the frame and engine parts of the machine are stationary are effected with greater speed and efficiency than formerly, and a saving in time and labor will obviously result in working the machine, especially on level or rising headings.

In this machine I have shown the horizontal arms *m m* provided with sweepers or scrapers similar to those described in my said former specification. I sometimes, however, find it advantageous to use the form of arms shown in Figs. 6, 7, and 8, in which the sweepers or scrapers are dispensed with and a tapered projection *b'* on the front of each of the horizontal arms *m* is used for the purpose of clearing the cuttings from the annular groove, so as to allow the arms and cutters to do their work. The thickness of the arms *m* is greater at the front, from which the nose or tapered projection *b'* projects, than at the back, as will be seen by referring to Fig. 8, so that in the process of cutting any cuttings that may pass the front of the arms will not wedge or clog their action. The principle of the tapered projection is the same as the scrapers and sweeps of my said former patent; but it has the advantage that a narrower groove can be made, which in very hard material is sometimes found an advantage. It is evident that the tapered projection can be used in combination with the said scrapers or sweepers.

Referring to the modified form of my invention illustrated in Figs. 9 to 13, the cutters are shown arranged upon the face of the radial arms carried by the screw-threaded shaft *c*, so as to cut away the entire face of the tunnel. The cutters are of two different lengths, as clearly shown in Fig. 9, the longer ones cutting into the face of the tunnel and the shorter ones serving to remove any ribs that may remain on the said face between the cuts made by the longer cutters. The arms *m* are provided with sweepers *c'*, which sweep the cuttings and fine material as they fall from the face of the tunnel back to the side thereof within range of scrapers *d'*, attached to an endless belt *e'*, by which the cuttings are passed from the front to the rear of the machine, whence they are removed by any suitable means. The belt *e'* is carried on and worked by wheels *f' f'*, which are revolved on the projecting shafts *g' g'* by means of bevel-wheels *h' h'*, driven from the screw-threaded shaft *c*, while the face of the tunnel is being cut away.

The carrying-wheels *y y* are spiked or roughened, as shown, and the machine carries similarly spiked or roughened wheels *y' y'* at its upper part. These wheels *y* and *y'* are intended to bite into the floor and roof of the tunnel, and the bearings *i' i'* of their axles *j' j'* are adjustable to alter the height and direction of the wheels by means of set-screws *k'* and *l'*. By this means the direction of the cutting can be altered and regulated.

*z' z'* are rollers carried on the ends of the shafts *g' g'*, and serving to steady and support the machine on that side by bearing and running against the side of the tunnel.

The screw-threaded shaft *c* is carried in bearings at the front and back of the frame *d* of the machine, and is prevented from sliding longitudinally by means of collars *m' m'* fixed thereon. The screw-thread of the shaft *c* is formed on a rearwardly-extending portion, and the whole machine is advanced while the cutting is in progress by means of a divided nut *a''*, in which the screw-threaded portion of the shaft *c* works while the cutters are operating on the face of the tunnel. The two parts of the nut *a''* are hinged at *n'* to a frame *p'*, formed separate from the machine and adapted to be fixed in the tunnel by means of a pair of cows *q' q'*, mounted on pivots *r' r'*, movable in slots *s' s'* in the frame *p'*. The distance at which the cows *q'* project from the ends of the frame is adjusted by operating set screws *t' t'* working in the pivots *r'* and in brackets *v' v'* in the frame *p'*, and when the frame is fixed in position the cows bear against the ends of the angle-iron of which the frame is formed. The frame *p'* is also provided with a smooth bearing *w'* to allow the frame to slide along the shaft when the nut *a''* is opened, as hereinafter described. By this means when the frame *p'* has been placed in proper position in the tunnel and the cutter-shaft *c* is revolved to cut away the face of the tunnel the screw-threaded extension of the shaft, working in the split nut *a''*, will cause the whole machine to move forward as fast as the face of the tunnel is cut away until the rear end of the shaft *c* has worked up to the nut. By then stopping the engine and simply opening the nut $a''$ and unfixing the frame $p'$ the latter can be slid along the shaft into position ready to be again fixed to continue the cutting.

The propelling frame shown in Figs. 14 and 15 is the same as that hereinbefore described with reference to Figs. 9 to 13, with the exception that, instead of hinged cows, strong screw-pins $q'$ $q'$ are used, which work through the two brackets or angle-plates $v'$ $v^2$, which also serve to strengthen and hold the frame $p'$ together.

By the use of this improved tunneling machine and the manner of advancing it for cutting and of bringing back the cuttings, much time and labor are saved and a speedy, sure, and steady advance is made. The time required for setting the propelling bracket for another cutting is short, and this is the only cause for delay in the cutting operations except the always-necessary time for changing cutters, attaching pipes, and doing necessary repairs.

The machine may be regarded as comprising a main frame or bed frame, the cutters, and a carrier, support, or frame for the cutters mounted on the main frame or bed frame. The said carrier, support, or frame for the cutters, as shown, consists of the radial arms $m$ $m$ with forwardly projecting bars, as in Figs. 1 and 6, (if necessary), and the supporting and feeding shaft $c$. But I do not wish my invention to be limited to this exact form of cutters, or cutter carrier or frame. The main frame or bed frame as above described can be made temporarily stationary relatively to the cutters and cutter carrier or frame, and the latter frame for the carriers can also be made stationary, and the main frame or bed frame moved relatively thereto.

As shown the engines are mounted on the frame designated as the main frame or bed frame, which engines as above described not only impart power to the cutters, but also, on the one hand, advance the cutter frame or carrier, and then, on the other hand advance the main frame or bed frame.

Machines have been heretofore constructed in which the engines were mounted on the cutter frame or carrier, and I do not limit myself to the exact location shown for them, one of the essential features of the invention being that power for advancing the main frame while the cutter frame and the cutters thereon are stationary is taken from the same engines which advance the cutters and cutter frame.

On some of the earlier machines two separate engines or sets of engines have been used, one for rotating the cutters and having permanent connection therewith, and the other for rotating one part or another of the feeding mechanism and having permanent connection with such part, the patent No. 307,278, of October 28, 1884, to Thomas English, illustrating machines of that sort.

One of the main difficulties experienced in using tunneling or heading machines as heretofore constructed has arisen from the fact that there was no room for operatives to stand or sit adjacent to the face of the material being cut, the presence of operatives at that place being often necessary in order to work the machine efficiently. A great deal of time is consumed, especially in working coal, in getting the cuttings and débris away from the face and carrying it past the machine to points behind it. The machines have had bottom supports consisting of arms and wheels, there being in all cases wheels arranged in pairs, those of each pair being on a transverse axis, and in most cases the arms and wheels of each pair projected outwardly toward the sides, and were necessarily in the way of operatives, either when themselves passing back and forth, or when they were passing material back to points behind the machine. I obviate the difficulties incident to those earlier machines of the sort having the expanded wheel base. I place these wheels in substantially the central longitudinal vertical plane of the machine, so that they rest on the central part of the bottom of the bore or tunnel which of itself is sufficient as a track, particularly when, the wheels have comparatively wide peripheries and when use is made of the devices above described for effecting the lateral horizontal adjustment of the bed or main frame.

The parts at Z Z can be used to hold the machine down firmly on the central wheels, they, and the downwardly inclined braces at the rear end and at the bottom of the frame, not only constituting an anchoring or jacking mechanism to prevent reaction, but also being adapted to assist in holding the machine in position after it has been adjusted by the hinge braces $x$ $x$.

By examining Fig. 2 it will be seen that I provide a large open space at the side of the machine extending to the face of the material. There can be such an open space on each side of the machine when the wheels are arranged in the way I provide, though I prefer to utilize one of said spaces as a place for the carrier $d'$ $e'$. It will be understood that a side carrier of this sort can be used with a machine like that in Figs. 1 and 2 as well as that in Figs. 9 and 10. I am aware of the fact that a carrier has been employed with a tunneling machine of one of the sorts above referred to, that is one in which the parts of the machine were so arranged that they took up all the available space in the tunnel so that it is practically impossible for an operative to stand or sit adjacent to the face of the material either for the purpose of attending to the machine or for effecting the loading of the carrier. The aforesaid patent to English, No. 307,278, illustrates these matters also.

At W Fig. 10 there is a seat or rest for an operative.

At $c^3$ Figs. 9 and 10 there is shown a guide or fender to carry the cuttings out of the path of the machine and into the path of the carrier $d' e'$. Large pieces of coal or other material which escape from the conveyer $c'$ can be picked up by the operative and delivered to the carrier.

What I claim is—

1. In a tunneling machine, the combination of a frame carried on central tandem wheels working on the floor of the tunnel, a central threaded shaft carried by such frame, a driving wheel working on such shaft, radial arms and horizontal arms at one end of said shaft and provided with cutters and scrapers adapted for forming an annular groove around the face of the tunnel, the said frame carrying engines and gearing for actuating the above-named devices, and a spur wheel with threaded boss or bush working on the threaded portion of the said shaft, bearing against the frame, driven by gearing from the engine or engines, and serving the purpose either of actuating the central shaft and its arms and cutters while the said frame, its engines, and gearing are held stationary in the tunnel, or of actuating the frame and its engine and gearing while the shaft and arms are held stationary, substantially as described.

2. In a tunneling machine, the combination of a bed frame, a cutter frame mounted therein and carrying intermittingly rotating cutters constructed to cut a tunnel adequate to receive the whole machine, an anchor for said bed frame when the cutter frame is advancing, an engine on the bed frame, gearing connecting said engine to the cutting mechanism for intermittently operating the same, and feeding devices operated by said engine and connecting with the cutters and acting to advance the cutter frame when the cutting mechanism is operating, and to advance the bed frame when the cutting mechanism is stationary and not operating, substantially as set forth.

3. In a tunneling machine, the combination of a bed frame, a cutter frame mounted therein and carrying intermittingly rotating cutters constructed to cut a tunnel adequate to receive the whole machine, a rotatable nut on one of said frames, a rotatable threaded shaft on the other of said frames and engaging with said nut, an engine, and two alternately acting sets of gearing, one connecting said engine to the threaded shaft and the other connecting said engine with said nut, substantially as set forth.

4. In a tunneling machine, the combination of a bed frame, a cutter frame carrying cutters and having a revolving threaded shaft, an engine on the bed frame, gearing connections from the engine to said shaft, a rotatable nut on the bed frame engaging with the shaft, and gearing connections from the engine to said nut, disconnecting devices between the engine and nut, and a lock for the nut to hold it stationary, whereby said shaft advances relatively to the bed when rotated and the bed advances relatively to the cutter frame when the nut is rotated, substantially as set forth.

5. In a tunneling machine, the combination of a bed frame, a cutter frame adapted to advance relatively to said bed frame, an engine having an engine shaft on said bed, connections from said engine shaft to the cutting apparatus, disconnecting devices between the engine shaft and cutting apparatus, a rotatable nut on the bed frame, a lock for said nut, a threaded shaft on the cutter frame engaging with said nut, and gear connections between the engine shaft and the said nut and adapted to rotate the same when the engine shaft is disconnected from the cutting apparatus, substantially as set forth.

6. In a tunneling machine, the combination of a bed frame, and an anchor for the same, a cutter frame mounted therein and adapted to advance relatively to said bed, intermittingly revolving cutters thereon constructed to cut a tunnel adequate to receive the whole machine and an anchor for said cutter frame, an engine on the bed frame and connections from said engine to the cutting apparatus of the cutter frame, disconnecting devices between the engine and said cutting apparatus, and feeding mechanism between the engine on the bed frame and the cutter frame having disconnecting devices therein, substantially as set forth.

7. In a tunneling machine, the combination of a bed frame, a cutter frame mounted therein on a horizontal axial shaft substantially parallel with the path of advance and having cutting apparatus operating at the outer ends of the frame to form a tunnel or aperture of dimensions adequate to receive the whole machine, an anchor for fastening the bed stationary while the cutting apparatus is at work, an engine on the machine detachably connected to the cutting apparatus and advancing mechanism, and adapted to alternately advance the bed and the cutting apparatus respectively, substantially as set forth.

8. In a tunneling machine, the combination of a bed frame, the intermittently rotating cutting apparatus, the engine on the bed frame intermittingly connected to the cutting apparatus to rotate the same, cutter advancing mechanism driven by the engine, an anchor for holding the bed stationary while the cutting mechanism is advancing, and means for throwing the cutter advancing mechanism out of action, substantially as set forth.

9. In a tunneling machine, the combination of the bed and means for fastening the bed stationary, the cutters, constructed to cut a tunnel adequate to receive the whole machine a cutter frame or support adapted to advance relatively to the bed while the cutters are at work, an anchor for the cutter frame engaging with the tunnel wall, the engine on the machine detachably connected to the cutters, and means actuated by said engine for advancing the bed, substantially as set forth.

10. In a tunneling machine, the combination of a bed frame and a cutter frame adapted to advance with relation to the bed frame, said cutter frame having a shaft rotating in a horizontal axis and carrying the cutters rigid therewith, an engine on the bed frame, and gearing connections therefrom to the cutter frame, whereby the engine can cause the advance of the cutter frame said gearing having disconnecting devices therein, substantially as set forth.

11. In a tunneling machine, the combination of a bed frame, a cutter frame having a threaded shaft, a single engine on the bed frame, gearing connections between the engine and the cutter frame for rotating said cutter frame, a rotatable nut on said bed frame, gearing connections between the engine and nut, a clutch for throwing said gearing out of action, and a lock for said nut, substantially as set forth.

12. In a tunneling machine, the combination of a bed frame, a cutter frame mounted in and adapted to advance with relation thereto and carrying the cutters, supporting wheels for the bed frame situated in the central longitudinal plane thereof, and jacking mechanism connected to the bed frame above the center thereof and adapted to anchor the bed frame and adjust the upper part thereof horizontally or laterally, substantially as set forth.

In testimony whereof I affix my signature in presence of two witnesses.

REGINALD STANLEY.

Witnesses:
T. RAYMOND BURTON,
ERNEST HARKER.